United States Patent [19]

Kleeberg et al.

[11] 4,050,871
[45] Sept. 27, 1977

[54] APPARATUS FOR MAKING PELLETS USABLE AS AGGREGATE OR FILLER

[75] Inventors: Ulrich Kleeberg, Muhlheim (Ruhr); Jürgen Leimkühler, Essen; Jürgen Knospe, Herbern; Manfred Stöhr, Essen, all of Germany

[73] Assignees: Gottfried Bischoff Bau kompl. Gasreinigungs-und Wasserruckkuhlanlagen Kommanditgesellschaft; STEAG Aktiengesellschaft, both of Essen, Germany

[21] Appl. No.: 687,391

[22] Filed: May 17, 1976

Related U.S. Application Data

[62] Division of Ser. No. 593,670, July 7, 1975.

[30] Foreign Application Priority Data

July 6, 1974 Germany .............................. 2432572

[51] Int. Cl.² .............................................. B29J 1/00
[52] U.S. Cl. .................................. 425/317; 425/210; 425/222; 425/DIG. 201; 261/DIG. 9; 264/117
[58] Field of Search ..... 264/117; 425/222, DIG. 201, 425/317, 210; 23/313 R, 314; 261/DIG. 9, DIG. 54

[56] References Cited

U.S. PATENT DOCUMENTS

| 2,457,962 | 1/1949 | Whaley ............................ 425/222 X |
| 2,684,290 | 7/1954 | Alexander et al. .............. 425/222 X |
| 3,406,426 | 10/1968 | Pobst, Jr. et al. ................ 425/222 X |
| 3,700,461 | 10/1972 | Dickens, Jr. ...................... 425/222 X |

*Primary Examiner*—Robert L. Spicer, Jr.
*Attorney, Agent, or Firm*—Karl F. Ross

[57] ABSTRACT

Waste gas from a coal-fired power plant is scrubbed with a lime-water mixture to form a sludge whose water content is reduced and which is mixed with a binder such as water glass. This mixture is then pelletized to produce hard water-stable material suitable for use as an aggregate or filler. The waste gas may be stripped of its fly ash and this ash added to the sludge to thicken it.

3 Claims, 2 Drawing Figures

APPARATUS FOR MAKING PELLETS USABLE AS AGGREGATE OR FILLER

This is a division of application Ser. No. 593,670, filed July 7, 1975.

FIELD OF THE INVENTION

The present invention relates to an apparatus for making pellets usable as aggregate or filler. More particularly this invention concerns such a system and plant for using the pollutants in the waste gas of a coal-fired power plant as the starting material for such pellets.

BACKGROUND OF THE INVENTION

In order to minimize air pollution by power plants it is known to separate from the waste gas of such plants the particulate material or fly ash in a cyclone or the like and mix it with a binder. This binder is then agglomerated with or without the addition of other fillers and converted into briquets. In such a system the fly ash itself constitutes part of the aggregate of such briquets.

This has proven to be successful but does not eliminate gaseous pollutants, such as $SO_2$, $SO_3$, and HF, which must be removed from the waste gas. It is known in order to remove these aforementioned gaseous pollution substances to admix the flue gas with lime and then scrub it with water. The flue gas is treated with an amount of lime, in form of CaO or $Ca(OH)_2$, necessary to eliminate the gaseous pollutants. After this procedure and after washing a sludge is obtained which mainly comprises $CaSO_4$ and $CaSO_3$, and in case of a coal burning plant also flue dust or fly ash.

In big plants this sludge accumulates in large quantities. Its disposal creates a problem. A purposeful utilization has not been suggested.

OBJECTS OF THE INVENTION

It is therefore an object of the present invention to provide an improved apparatus for treatment of the pollutants of flue gas from a power plant.

Another object is to provide an apparatus for using the gaseous polluting substances from flue gases of power plants to produce pellets suitable for use as aggregates or filling material.

SUMMARY OF THE INVENTION

These objects are obtained according to the present invention by providing a method of producing pressure-resistant and substantially water-stable pellets suitable for use as aggregates or filler.

In accordance with the present invention therefore the flue gas of power plants is scrubbed after being admixed with line. The water content of the sludge so obtained is reduced and the concentrated sludge is treated with a hydraulic binder or with water glass. The mixture is pelletized, and the pellets are finally hardened in air, and/or in an autoclave, and/or are burnt in a neutral atmosphere.

In accordance with the present invention the aforementioned sludge can be pelletized by reducing its water content and mixing the sludge with a suitable binder, especially a hydraulic binder such as cement, other hydraulic binders, e.g. gypsum, clay, lime or mixtures thereof, can also be used. Water glass is also usable as a binder. Surprisingly, even after being hardened only by air the pellets have considerable strength and water stability which increases with time. Strength and water stability can be further increased by burning. The amount of binder depends on the desired final strength, and amounts to approximately 1/100 to 1/5 of the water-content-reduced sludge.

The pellets produced can be used for various purposes, such as:
- filling of shut-down gravel pits, shut-down mining tunnels, or other undesired excavations,
- filling undesired water areas such as excavated lakes, for the reclamation of land at the ocean, and for consolidation of boggy subsoils,
- for road-building either comminuted or whole, or if necessary mixed with other aggregates,
- in concrete, if necessary mixed with gravel if the desired concrete strength is not too high, and
- for untreated sludge, also sludge obtained from flue gas of power plants after undergoing washed, either deposited homogeneously or in layers.

In all cases, especially where the pellets are used broken or unbroken as aggregates, burnt pellets find a useful purpose. The burning serves to evaporate the water in the pellets and to sinter at least the surface of the pellets.

According to a feature of the invention the sludge is sedimented to a water content of between 20% and 40%, or approximately 30%, thereafter it is heat-dried to a water content of between 10% and 20%, or approximately 15%, and then it is mixed with a hydraulic binder or with water glass for pelletizing.

Where the flue gas of coal-burning power plants is treated, a modified method may be used. The flue gas is stripped of flue dust by means of electrostatic precipitation or a cyclone before it is scrubbed. The fly ash so removed is added back to the sludge later, preferably together with the hydraulic binder or water glass before pelletizing. If fly ash is added together with the hydraulic binder the water content of the sludge should be 30% before mixing, and water can be added in amounts needed to assure proper pelletizing.

According to another feature of the present invention a plant is provided to carry out the aforedescribed method. The basic arrangement of the plant comprises a scrubber with means for injecting pulverulent lime as a dispersing agent, a decanter for sedimenting the sludge so formed, a mixer with means for injecting a hydraulic binder or water glass into the concentrated sludge, and a pelletizing device, e.g. a pelletizing drum.

Means are provided to conduct the sludge from the scrubber to the decanter, and to carry the decanted sludge to a heat dryer, from the dryer to the mixer, and from the mixer the sludge is carried to the pelletizer.

When a fly-ash remover is installed before the washing installation, especially in case of a coal-burning plant, the interposition of a heat dryer is unnecessary. The sludge coming from the washing installation is mixed with the fly ash stripped from the waste gas before scrubbing thereof, together with a hydraulic binder and a pelletizable mixture is obtained. In this case a drying installation is installed after the pelletizer.

A plant designed to carry out the method of the present invention works very economically if the drying installation or the burning installation is constructed as a traveling-grate device or as a rotary kiln and is directly or indirectly heatable with the flue gas or part of the flue gas from the power plant. The pelletizing drum is always provided with a device for water supply.

BRIEF DESCRIPTION OF THE DRAWING

The above and other objects, features, and advantages of the invention will become more readily apparent from the following description, reference being made to the drawing in which.

SPECIFIC DESCRIPTION

Figures 1, 2:
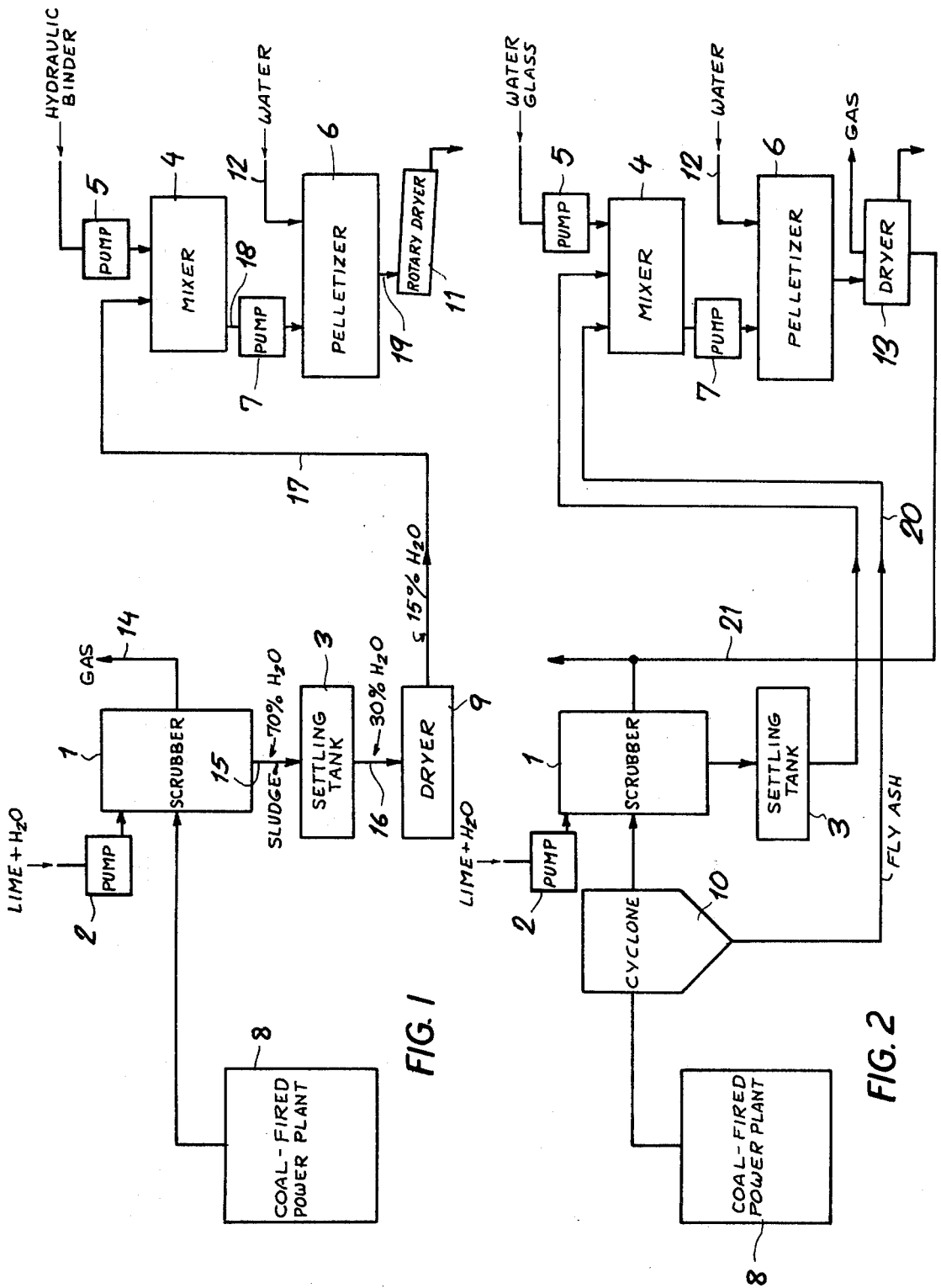
FIG. 1 is a diagrammatic view illustrating a plant for carrying out the method according to this invention.
FIG. 2 is a view similar to FIG. 1 illustrating another plant in accordance with this invention.

The plants of FIGS. 1 and 2 both comprise a scrubber 1 as described on page 14–37 of the *Chemical Engineers' Handbook* by J. Perry (McGraw-Hill 1963) with a pump 2 for introducing a mixture of lime and water. The scrubbed gas issues from the scrubber 1 at 14 and the sludge at 15. Waste gas from a coal-fired power plant 8 is fed to the scrubber 1.

A settling tank or decanter 3 is connected to the output 15 of the scrubber 1 and has an output 14 connected to a heater-dryer 9 whose output 17 in turn is fed to a mixer 4. A pump 5 feeds a hydraulic binder to the mixer 4. The *Chemical Engineers' Handbook* (op.cit.) shows settler-decanters at pages 21–18 ff, mixers at 21–21ff, and dryers at pages 20–10ff.

Thereafter the mixture from the output 18 of the mixer 4 is introduced by a pump 7 into a pelletizer or nodulizer 6 to which water is fed at 12 and pellets issuing from the output 19 thereof are fed to a rotary dryer 11. Pelletizers are described on pages 8–61ff of the *Chemical Engineers' Handbook* and dryers on pages 20–17ff.

The arrangement of FIG. 2 differs from that of FIG. 1 in that the flue gas from the coal-fired power plant 8 is first passed through a cyclone 10 (see pages 20–68ff op.cit.) to separate out dry fly ash which is fed through a line 20 to the mixer 4 where it is mixed with the partically dried sludge coming directly from the settler 3 and with water glass ($Na_2SiO_3 + H_2O$) fed in by a pump 5'. A travelling grate dryer 13 is used for the pellets (see pages 20–5 op.cit.). The use of dry fly ash from the cyclone 10 eliminates the need for the dryer 9. Some of the particle-free flue gas is fed by a line 21 from the scrubber 1 to the dryer 13 to heat same.

In both plants as shown in FIGS. 1 and 2 the sludge at the output 15 of the scrubber has a water content, by weight, of approximately 70%. The settling tank reduces this by dewatering to approximately 30%, and the dryer in the apparatus of FIG. 1 lowers the content to about 15%.

Thus in accordance with the present invention the flue gas issuing from the plant 8 is mixed with pulverulent lime and scrubbed. The sludge so produced is dryed and mixed with a binder, then the mixture is pelletized and hardened either by drying or burning in a neutral atmosphere.

The following Example illustrates the Invention.

EXAMPLE

A quantity of 141 kg of sludge drawn off the scrubber 1 is dried to a moisture content of 9.4%, and is treated with 21.1 kg Z 350 cement. The mixture then had a moisture content of 7.7%, and was pelletized in a commercial pelletizing drum 6. The unburnt pellets hardened only by air drying had the following qualities:

| | |
|---|---|
| water content (by weight) | 14.8% |
| bulk weight | 1.5 kg/liter liter |
| strength after | |
| 1 day of air storage | 11 kg/pellet 12 mm $\phi$ |
| 3 days of air storage | 16 kg/pellet 12 mm $\phi$ |
| 56 days of air storage | 166 kg/pellet 12 mm $\phi$ |
| Hardened in an autoclave after 1 day storage in air | 70 kg/pellet 12 mm $\phi$. |

To determine the stability in water a soak test was conducted. Pellets stored 9 days in air and 5 days in water yielded the following analysis for the overlying water:

| | |
|---|---|
| pH | 12.6 |
| conductivity | 3150 μ/cm |
| $SO_4^{--}$ | 23 mg/liter |
| $SO_3^{--}$ | 37 mg/liter |
| $Ca^{++}$ | 150 mg/liter |
| Total hardness | 24.0° dH. |

Subjecting the pellets to a burning process instead of drying in air gives them a considerable increase of the strength factor depending on the burning procedure. In addition similar values are obtained by mixing the sludge with flue dust, and reducing the content of hydraulic binder.

We claim:

1. A plant for making hard and water-stable pellets usable as aggregate or filler, said plant comprising:
   means including a scrubbing tower for treating a waste gas containing pollutants with water and lime to form a sludge containing said pollutants;
   means connected to said tower for partially dewatering said sludge;
   means connected to the dewatering means for mixing the dewatered sludge with a binder;
   means connected to the mixing means for pelletizing said sludge; and
   means for removing particulate material from said gas prior to treatment thereof and for introducing said particulate material into the dewatered sludge at said mixing means.

2. The plant defined in claim 1, further comprising means for drying and hardening the pelletized sludge.

3. The plant defined in claim 2, further comprising means for feeding said gas after treatment thereof with water and lime to the drying means.

* * * * *